United States Patent [19]

McAnally et al.

[11] Patent Number: 5,734,557
[45] Date of Patent: Mar. 31, 1998

[54] MOUNTING ASSEMBLY FOR ELECTRONIC EQUIPMENT

[75] Inventors: Andrew McAnally; Stephen Cook, both of Georgetown, Tex.

[73] Assignee: Dell U.S.A., L.P., Austin, Tex.

[21] Appl. No.: 713,616

[22] Filed: Sep. 13, 1996

[51] Int. Cl.⁶ .............................. G06F 1/16; H05K 7/18
[52] U.S. Cl. .................. 361/727; 361/683; 361/730
[58] Field of Search ............................... 361/683–686, 361/724–727, 728–730, 796, 797, 799; 312/223.1, 223.2; 364/708.1; G06F 1/16

[56] References Cited

U.S. PATENT DOCUMENTS

| | | | |
|---|---|---|---|
| 4,979,909 | 12/1990 | Andrews | 439/352 |
| 5,123,721 | 6/1992 | Seo | 312/333 |
| 5,262,923 | 11/1993 | Batta et al. | 361/685 |
| 5,317,483 | 5/1994 | Swindler . | |
| 5,325,263 | 6/1994 | Singer et al. | 361/683 |
| 5,340,340 | 8/1994 | Hastings et al. | 439/64 |
| 5,398,157 | 3/1995 | Paul | 361/684 |
| 5,404,268 | 4/1995 | O'Connor . | |
| 5,497,292 | 3/1996 | Gandre . | |
| 5,564,804 | 10/1996 | Gonzalez et al. | 312/223.2 |

*Primary Examiner*—Lynn D. Feild
*Attorney, Agent, or Firm*—Haynes and Boone L.L.P.

[57] ABSTRACT

A mounting assembly for mounting a component in an enclosure for electronic equipment, such as a computer, and having at least one mounting plate. The mounting assembly includes a sled member extending around a portion of the component, and at least one alignment member engaging the component and attached to the sled member for locating the sled member relative to the component. A portion of the alignment member protrudes outwardly from the plane of the spring member, so that, when the component, and therefore the mounting assembly, are advanced towards the plate, the protruding portion is engaged by the mounting plate to secure the component in the enclosure and establish an electrical ground.

18 Claims, 3 Drawing Sheets

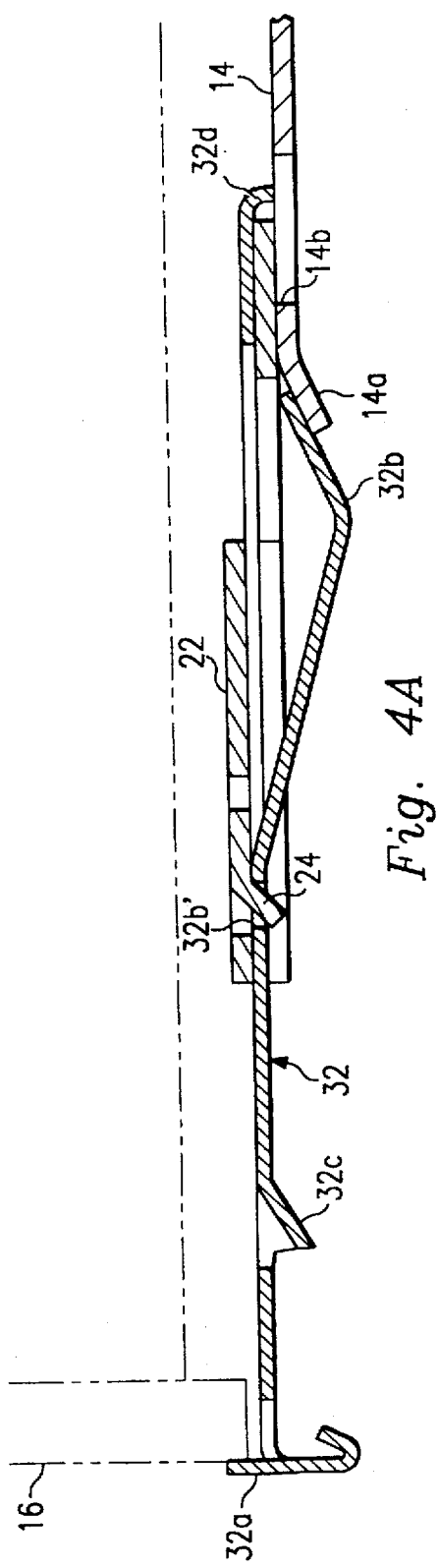
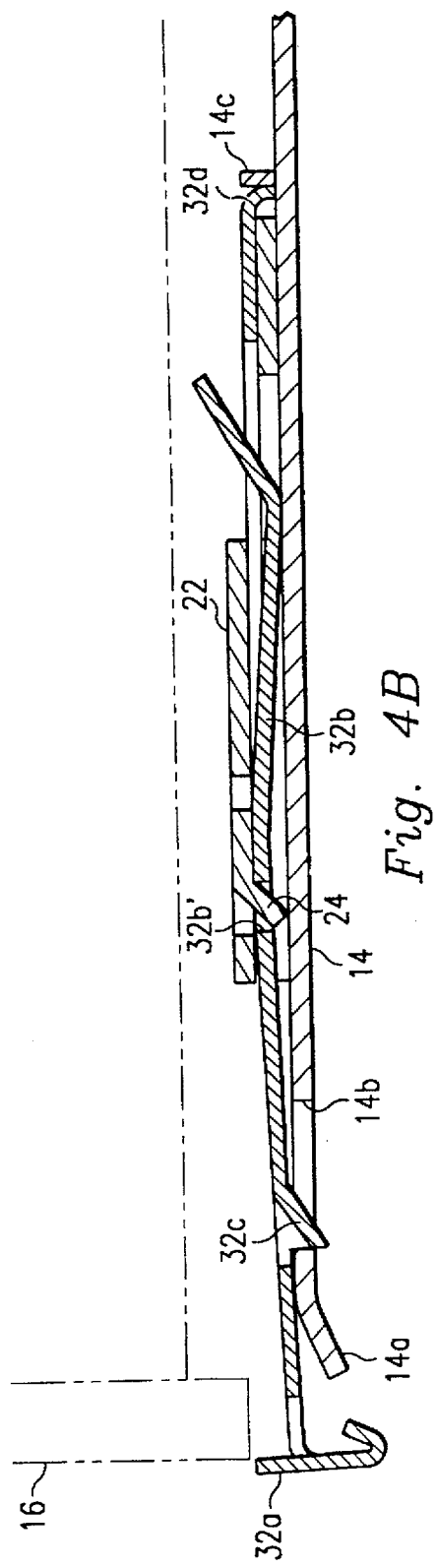

MOUNTING ASSEMBLY FOR ELECTRONIC EQUIPMENT

TECHNICAL FIELD

The invention relates generally to the field of electronic equipment, such as computers and, more particularly, to a mounting assembly for mounting an electronic component in an enclosure.

BACKGROUND OF THE INVENTION

Many types of desktop computers, and other similar types of electronic equipment, incorporate several components, sub-assemblies, and the like into a single enclosure, or chassis. Various types of mounting assemblies, such as mounting rails or plates, have evolved for mounting the components or subassemblies in the enclosure, while providing high quality fit and finish to the products and a neat interior. For example, computers often contain drive assemblies for software media, such as CD ROMS, which are mounted in a specific position in an enclosure, either directly to the enclosure or between a pair of spaced mounting rails or plates installed in the enclosure. To this end, various alignment fixtures and techniques have been used to align the rails or plates so that the drive assembly will be precisely located in the enclosure.

However, these fixtures and techniques often do not enable the rails or plates to be installed relative to the enclosure, and the drive assembly installed relative to the rails or plates, with a great deal of precision. As a result, it is difficult to initially install the drive assembly in the enclosure and/or reinstall the assembly with any precision after removal for repair or replacement. Moreover, the drive assembly must be electrically grounded to the enclosure to reduce electromagnetic interference, and any misalignment of the above type could compromise the ground.

Also, in the event the drive assembly must be removed or replaced, the current mounting fixtures and techniques do not allow an easy or convenient way for customers and service personnel to provide the same fit and finish.

Therefore, what is needed is a mounting assembly which makes it easy and convenient to install a component at a precise location in an enclosure, yet enables the component to be removed and reinstalled or replaced while maintaining a high quality fit and finish and a strong electrical ground.

SUMMARY OF THE INVENTION

The present invention, accordingly, provides a mounting assembly for mounting an electronic component in an enclosure of a computer, or the like, at a precise location, while eliminating any alignment or electrical grounding problems, while permitting the component to be reinstalled with the same degree of fit and finish. To this end, the mounting assembly of the present invention includes a sled member attached to the component and an alignment member attached to the sled member and engaging the component for precisely locating the sled member relative to the component. A portion of the alignment member protrudes outwardly from the plane of the spring member so that, when the component, and therefore the mounting assembly, is advanced towards its mounted position, this finger portion is engaged by a mounting plate of the enclosure, to secure the assembly relative to the wall and establish an electrical ground.

An advantage is thus achieved with the present invention since the component can be installed at a precise location and it, or the mounting assembly, will not become misaligned during manufacture or use. Another advantage of the present invention is that the component can be reinstalled with the same degree of fit and finish with the mounting assembly of the present invention being hidden from view. Also, due to the relatively large surface contact between the finger of the mounting assembly and the mounting plate, a strong electrical ground is established from the component, through the mounting assembly of the present invention, and to the mounting plate of the enclosure.

BRIEF DESCRIPTION OF THE DRAWINGS

FIGS. 4A and 4B are sectional views of the mounting assembly of FIGS. 1–3, shown in two positions relative to a mounting plate of the enclosure.

DETAILED DESCRIPTION OF THE PREFERRED EMBODIMENT

Figure 1:
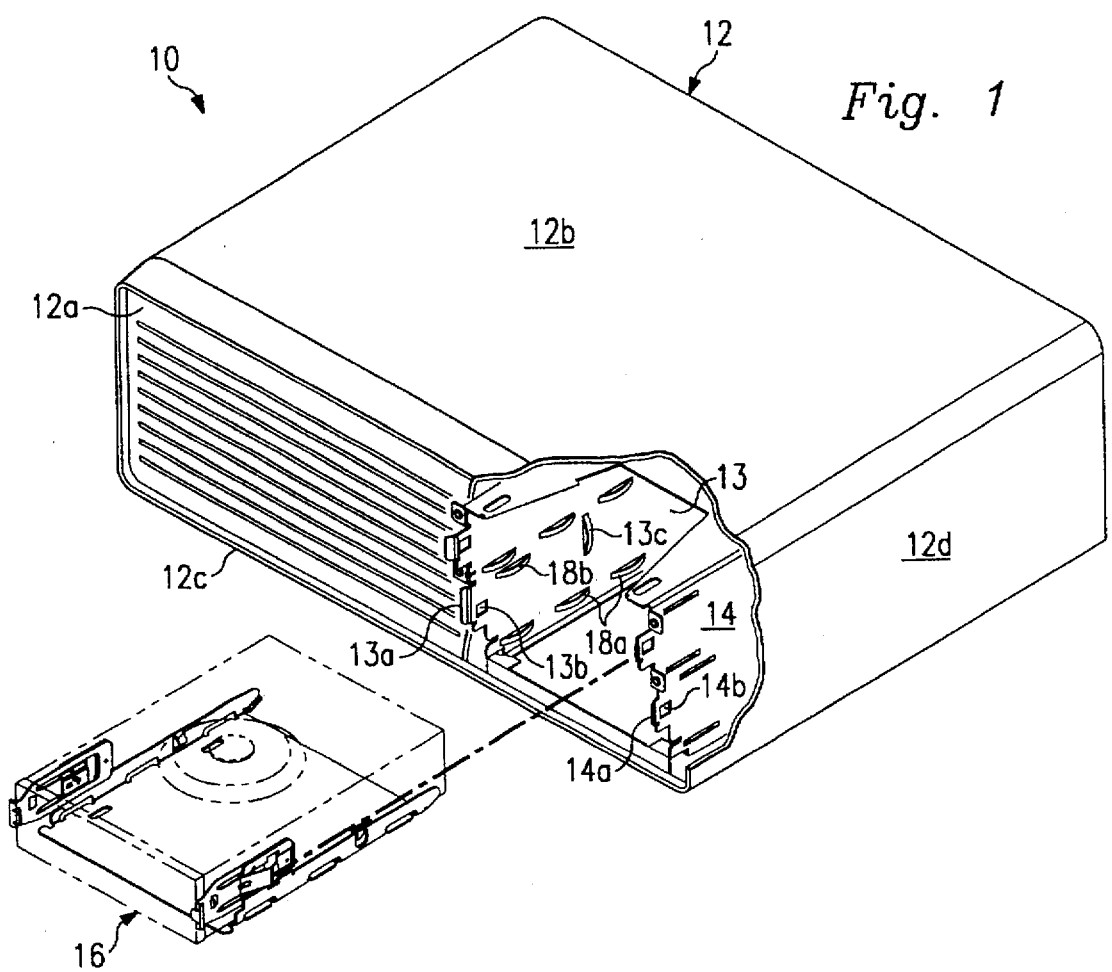
FIG. 1 is a perspective view, partially broken away, of a computer, as well as the mounting assembly of the present invention shown connected to a component of the computer prior to the component being mounted in the enclosure.

Referring to FIG. 1 of the drawing, the reference numeral 10 refers to a computer including an enclosure 12 having a front plate, or face 12a, a top plate 12b, a bottom plate 12c and two sidewalls, one of which is shown by the reference numeral 12d. Two spaced, parallel, upright mounting plates 13 and 14 are provided in the enclosure for receiving a component or subassembly 16 (shown in phantom lines for the convenience of presentation) which for example, is a CD ROM drive assembly. To this end, sections 13a and 14a of the respective front end portions of the plates 13 and 14 are bent outwardly, and an upper set and a lower set of spaced rails are formed on the inner surface of plate 13, with the lower set being shown by the reference numerals 18a and 18b. Although not shown in FIG. 1, it is understood that the plate 14 also has an upper set and a lower set of spaced rails formed on its inner surface in alignment with the rails, including the lower set 18a and 18b, on the plate 13. For the purpose of example, the drive assembly 16 will be shown inserted between the lower set of rails, including the rails 18a and 18b, on the plate 13, which function to guide and support the assembly in the drive assembly enclosure 12. It is understood that the upper set of rails on the plates 13 and 14 can also support the drive assembly 16 or another component in a similar manner. Slots 13b and 14b extend through the plates 13 and 14, respectively; and a stop tab 13c is formed on the plate 13 and an identical stop tab 14c (not shown in FIG. 1) is formed on the plate 14, for reasons to be explained.

Figure 2:
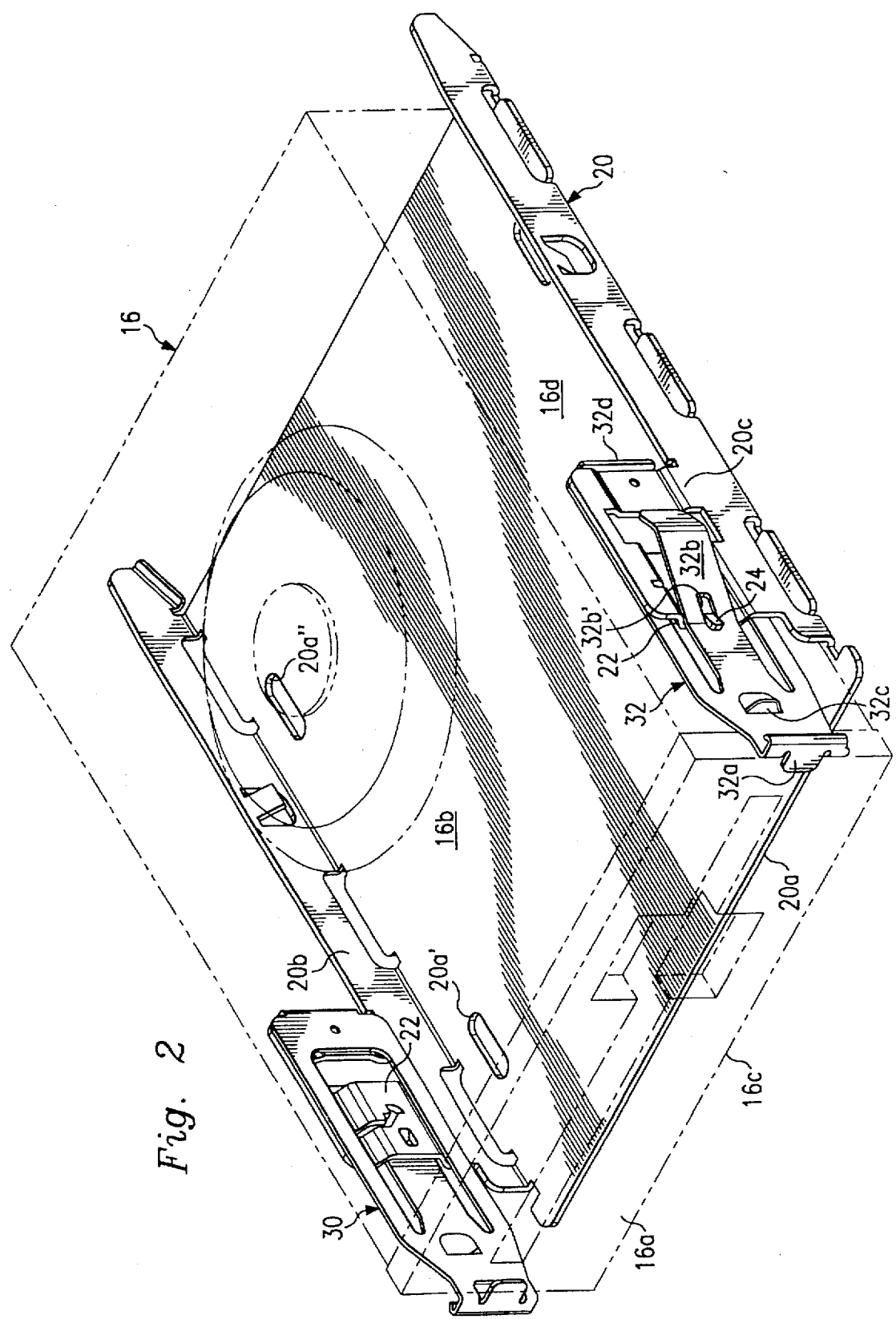
FIG. 2 is a perspective view of the mounting assembly shown connected to the component.

As better shown in FIG. 2, the drive assembly 16 has a front plate, or face 16a, a top plate 16b, a bottom plate 16c and two sidewalls, one of which is shown by the reference numeral 16d. A substantially U-shaped sled 20 is provided which has a bottom plate 20a extending under the bottom plate 16c of the drive assembly 16, and two sidewalls 20b and 20c which respectively extend adjacent the sidewalls, including the sidewall 16d, of the drive assembly 16. The inner surfaces of the bottom plate 20a engages the corresponding outer surfaces of the bottom plate 16c of the drive assembly 16 and four slots are provided through the bottom plate 20a, two of which are shown by the reference numerals 20a' and 20a" in FIG. 2.

The front end portions of the sidewalls 20b and 20c of the sled 20, as viewed in FIG. 2, have an extended height, and each has an indented portion 22 and a tab 24 (shown only in connection with the sidewall 20c) extending from the indented portion, for reasons to be described.

Two alignment members 30 and 32 are provided which cooperate with the sidewalls 20b and 20c, respectively, of the sled 20 to precisely locate the sled 20 relative to the drive assembly 16. Referring to the member 32 and the sidewall 20c in FIGS. 2 and 3 for the purpose of example, the member 32 is in the form of a plate that extends between the extended height portion of the sidewall 20c and the sidewall 16d of the drive assembly 16. An inwardly-directed tab 32a is formed on the front end of the member 32, and a spring finger 32b is formed by cutting away a portion of the plate forming the member 32 and bending it outwardly. A boss 32c is provided on the outer surface of the member 32, a slot 32b' is formed in the spring finger 32b, and a tab 32d is formed on the end of the member 32, for reasons to be described. It is understood that the member 30 is identical to the member 32.

Figure 3:
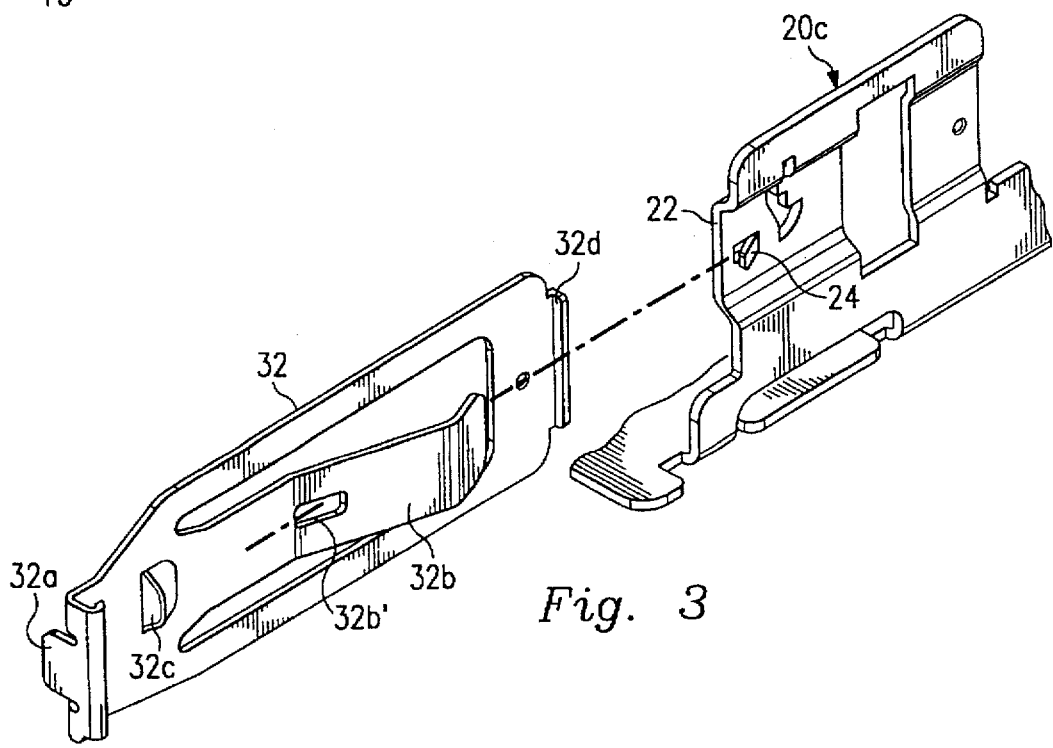
FIG. 3 is an enlarged, partial perspective view of portions of the mounting assembly before they are connected to each other.

Preferably, the spring members 30 and 32 are initially connected to the sidewalls 20b and 20c, respectively, of the sled 20 before the sled is connected to the drive assembly 16. To this end, the spring members 30 and 32 are advanced towards the sled 20 as shown in FIG. 3 in connection with the spring member 32. This movement continues until the tab 24 of the sidewall 20c extends in the slot 32b' of the finger 32 as shown in FIG. 2 and the tab (not shown) of the sidewall 20b extends in the slot (not shown) of the finger 30. In this connected position the tab 32d and the corresponding tab (not shown) formed on the finger 30, extend over the respective ends of the extended-height portions of the sidewalls 20b and 20c. In the assembled condition of FIG. 2, the extended-height portions of the sidewalls 20b and 20c extend between the fingers 30b and 32b and the remaining portions of the members 30 and 32, respectively. The members 30 and 32 are then fastened to the sidewalls 20b and 20c, respectively, in any known manner such as by staking, riveting, welding, or the like.

The assembly thus formed is then placed in engagement with the drive assembly 16 with the tabs 30a and 32a engaging the front face of the drive assembly, as shown in FIG. 2, to precisely locate the sled 20 relative to the drive assembly. The sled 20 is then attached to the drive assembly 16 in any known manner, such as providing screws or bolts (not shown) that extend through the four slots, including the slots 20a' and 20a", in the bottom plate 20a of the sled and into threaded holes (not shown) in the bottom plate 16c of the drive assembly 16.

The drive assembly 16, with the sled 20 and the members 30 and 32 attached thereto as shown in FIG. 2, is then positioned relative to the plates 13 and 14 (FIG. 1). In this position, the sidewalls 20b and 20c of the sled 20 are approximately aligned with the corresponding lower sets of rails, including rails 18a and 18b, formed on the plates 13 and 14, and the drive assembly 16 is advanced until the sled 20 rests on the lower rails 18 of the plates 13 and 14.

As shown in FIG. 4A in connection with the plate 14, the member 32 and the finger 32b, upon further advancement of the drive assembly 16 relative to the plate 14, the end portion 14a of the plate 14 engages the protruding portion of the finger 32b, and the outer surface of the finger thus "wipes" along the corresponding inner surface of the plate until the boss 32c of the member 32 snaps into the slot 14b of the plate 14, as shown in FIG. 4B. As also shown in FIG. 4B, a stop tab 14c is provided on the plate (which corresponds to the stop tab 13c of the plate 13 shown in FIG. 1) which is engaged by the tab 32d of the member 32. In this assembled position, the drive assembly 16 is secured and precisely located in the enclosure by the rails 18, the tight friction caused by the compression of the fingers 30b and 32b, and the engagement of the boss 32c in the slot 14b (and the engagement of the boss of the member 30 in the slot 13b of the plate 13).

During the above-mentioned movement of the drive assembly 16 into its mounted position between the plates 13 and 14, the engagement of the protruding portion of the finger 32b with the plate 14 causes a slight pivotal movement of the front end portion of the member 32 to move the tab 32a out of engagement with the front plate 16a. Also, the plate 13 engages and pivots the finger 30b of the member 30 in the same manner.

The drive assembly 16 can be removed from the enclosure 12 by simply slightly bending the front end portions of the members 30 and 32 inwardly, to release the tab 32c of the member 32 from the slot 14b of the wall 14 and the corresponding tab of the member 30 from the corresponding slot of the plate 13. The assembly 16 can then be pulled out from between the plates 13 and 14.

Although not shown in the drawings, it is understood that the front plate 12a of the enclosure 12 will be provided with a rectangular opening permitting access to the drive assembly and otherwise will cover the sled 20 and the members 30 and 32.

Several advantages are achieved with the mounting assembly of the present invention. For example, the drive assembly, or any other similar component, can be installed at a precise location in the enclosure 12 and neither it nor the mounting assembly will become misaligned during manufacture or use. Also the component can be reinstalled with the same degree of fit and finish with the mounting assembly of the present invention being hidden from view. Also, due to the above-mentioned wiping action of the fingers 30b and 32b against the corresponding surfaces of the plates 13 and 14, and the relatively large surface contact involved, surface contaminates are removed from the surfaces and a very strong electrical ground is established from the component, through the mounting assembly, and to the mounting plate of the enclosure.

It is understood that the mounting assembly of the present invention is not limited to mounting a drive assembly in a computer as described above by means of example, but is equally applicable for installing other components in other equipment within the scope of the present invention.

It is also understood that the embodiment of the mounting assembly of the present invention described above is intended to illustrate rather than limit the invention, and that the mounting assembly can take many other forms and embodiments within the scope of the invention.

What is claimed is:

1. A computer comprising an enclosure; at least one mounting plate disposed within the enclosure; a component; and a mounting assembly for mounting the component to the mounting plate, the mounting assembly comprising a sled member extending around a portion of the component, and at least one alignment member engaging the component and directly attached to the sled member for locating the sled member relative to the component, a portion of the alignment member protruding outwardly from the plane of the alignment member, so that, when the component, and therefore the mounting assembly, are advanced towards the mounting plate, the protruding portion is engaged by the mounting plate to secure the component in the enclosure and establish an electrical ground.

2. The computer of claim 1 wherein the component comprises a bottom plate and two walls and wherein the sled member comprises a bottom plate extending under the bottom plate of the component, and two walls extending adjacent the respective walls of the component.

3. The computer of claim 2 wherein the bottom plate of the sled member is attached to the bottom plate of the component.

4. The computer of claim 2 wherein there are two alignment members extending along the respective walls of the component and engaging the respective walls of the sled member; and wherein there are two mounting plates which respectively engage the protruding portions of the alignment members.

5. A mounting assembly for mounting a component in an enclosure having at least one mounting plate; the mounting assembly comprising a sled member extending around a portion of the component, and at least one alignment member engaging the component and directly attached to the sled member for locating the sled member relative to the component, a portion of the alignment member protruding outwardly from the plane of the alignment member, so that, when the component, and therefore the mounting assembly, are advanced towards the mounting plate, the protruding portion is engaged by the mounting plate to secure the component in the enclosure and establish an electrical ground.

6. The mounting assembly of claim 5 wherein the component has a bottom plate and two walls and the sled member comprises a bottom plate extending under the bottom plate of the component, and two walls extending adjacent the respective sidewalls of the component.

7. The mounting assembly of claim 6 wherein the bottom plate of the sled member is attached to the bottom plate of the component.

8. The mounting assembly of claim 5 wherein there are two alignment members extending along the respective walls of the component and engaging the respective walls of the sled member; and wherein there are two mounting plates which respectively engage the protruding portions of the alignment members.

9. A computer comprising an enclosure; at least one mounting plate disposed within the enclosure; a component; and a mounting assembly for mounting the component to the mounting plate, the mounting assembly comprising a sled member extending around a portion of the component, and at least one alignment member extending along a side wall of the component and comprising a tab engaging the component, the alignment member being attached to the sled member for locating the sled member relative to the component, a portion of the alignment member protruding outwardly from the plane of the alignment member, so that, when the component, and therefore the mounting assembly, are advanced towards the mounting plate, the protruding portion is engaged by the mounting plate to pivot the tab out of engagement with the component, to secure the component in the enclosure, and establish an electrical ground.

10. A computer comprising an enclosure; at least one mounting plate disposed within the enclosure; a component; and a mounting assembly for mounting the component to the mounting plate, the mounting assembly comprising a sled member extending around a portion of the component and having a tab protruding therefrom, and at least one alignment member engaging the component and having a slot for receiving the tab to locate the sled member relative to the alignment member and therefore to the component, the alignment member being attached to the sled member for locating the sled member relative to the component, a portion of the alignment member protruding outwardly from the plane of the alignment member, so that, when the component, and therefore the mounting assembly, are advanced towards the mounting plate, the protruding portion is engaged by the mounting plate to secure the component in the enclosure and establish an electrical ground.

11. A computer comprising an enclosure; at least one mounting plate disposed within the enclosure and having a slot; a component; and a mounting assembly for mounting the component to the mounting plate, the mounting assembly comprising a sled member extending around a portion of the component, and at least one alignment member engaging the component and attached to the sled member for locating the sled member relative to the component, the alignment member having a boss extending therefrom and a portion of the alignment member protruding outwardly from the plane of the alignment member, so that, when the component, and therefore the mounting assembly, are advanced towards the mounting plate, the protruding portion is engaged by the mounting plate and the boss of the alignment member extends in the slot of the mounting plate, to secure the component to the plate and establish an electrical ground.

12. A computer comprising an enclosure; at least one mounting plate disposed within the enclosure; a component; and a mounting assembly for mounting the component to the mounting plate, the mounting assembly comprising a sled member extending around a portion of the component, and at least one alignment member having a tab at one end thereof which extends over the corresponding end of the component, the alignment member being attached to the sled member for locating the sled member relative to the component, a portion of the alignment member protruding outwardly from the plane of the alignment member, so that, when the component, and therefore the mounting assembly, are advanced towards the mounting plate, the protruding portion is engaged by the mounting plate to secure the component in the enclosure and establish an electrical ground.

13. A mounting assembly for mounting a component in an enclosure having at least one mounting plate; the mounting assembly comprising a sled member extending around a portion of the component, and at least one alignment member extending along a side wall of the component and comprising a tab engaging the component, the alignment member being attached to the sled member for locating the sled member relative to the component, a portion of the alignment member protruding outwardly from the plane of the alignment member, so that, when the component, and therefore the mounting assembly, are advanced towards the mounting plate, the protruding portion is engaged by the mounting plate to pivot the tab out of engagement with the component, secure the component in the enclosure, and establish an electrical ground.

14. A mounting assembly for mounting a component in an enclosure having at least one mounting plate; the mounting assembly comprising a sled member extending around a portion of the component and having a tab projecting therefrom, and at least one alignment member engaging the component and having a slot for receiving the tab to locate the sled member relative to the alignment member and therefore to the component, the alignment member being attached to the sled member for locating the sled member relative to the component, a portion of the alignment member protruding outwardly from the plane of the alignment member, so that, when the component, and therefore the mounting assembly, are advanced towards the mounting plate, the protruding portion is engaged by the mounting plate to secure the component in the enclosure and establish an electrical ground.

15. A mounting assembly for mounting a component in an enclosure having at least one mounting plate provided with a slot; the mounting assembly comprising a sled member extending around a portion of the component, and at least one alignment member engaging the component and attached to the sled member for locating the sled member relative to the component, the alignment member having a boss projecting therefrom and a portion of the alignment member protruding outwardly from the plane of the alignment member, so that, when the component, and therefore the mounting assembly, are advanced towards the mounting plate, the protruding portion is engaged by the mounting plate, and the boss of the alignment member extends in the slot of the mounting plate to secure the component to the plate.

16. The computer as in one of claims 9–15 wherein the component comprises a bottom plate and two walls and wherein the sled member comprises a bottom plate extending under the bottom plate of the component, and two walls extending adjacent the respective walls of the component.

17. The computer of claim 16 wherein the bottom plate of the sled member is attached to the bottom plate of the component.

18. The computer of claim 16 wherein there are two alignment members extending along the respective walls of the component and engaging the respective walls of the sled member; and wherein there are two mounting plates which respectively engage the protruding portions of the alignment members.

* * * * *

UNITED STATES PATENT AND TRADEMARK OFFICE
CERTIFICATE OF CORRECTION

PATENT NO. : 5,734,557
DATED : March 31, 1998
INVENTOR(s) : Andrew McAnally and Stephen Cook It is certified that error appears in the above-identified patent and that said Letters Patent is hereby corrected as shown below:

On title page: Item [73] Assignee:

"Deli U.S.A., L.P." should be "Dell U.S.A., L.P."

Signed and Sealed this

Twenty-third Day of June, 1998

Attest:

BRUCE LEHMAN

*Attesting Officer*     *Commissioner of Patents and Trademarks*